United States Patent
Knight, III et al.

(10) Patent No.: US 8,616,834 B2
(45) Date of Patent: Dec. 31, 2013

(54) GAS TURBINE ENGINE AIRFOIL INTEGRATED HEAT EXCHANGER

(75) Inventors: Glenn Knight, III, Mason, OH (US); Bojan Lukovic, Liberty Township, OH (US); Daniel Laborie, West Chester, OH (US); Kenneth S. Scheffel, Edgewood, KY (US)

(73) Assignee: General Electric Company, Schenectady, NY (US)

( * ) Notice: Subject to any disclaimer, the term of this patent is extended or adjusted under 35 U.S.C. 154(b) by 555 days.

(21) Appl. No.: 12/771,508

(22) Filed: Apr. 30, 2010

(65) Prior Publication Data

US 2011/0268562 A1 Nov. 3, 2011

(51) Int. Cl.
*F01D 9/06* (2006.01)

(52) U.S. Cl.
USPC ........... 415/116; 415/175; 415/176; 415/178; 416/233

(58) Field of Classification Search
USPC ............ 415/142, 115–116, 175–178; 416/95, 416/96 R, 96 A, 97 R, 232, 233
See application file for complete search history.

(56) References Cited

U.S. PATENT DOCUMENTS

| | | | | | |
|---|---|---|---|---|---|
| 2,620,157 | A | * | 12/1952 | Morley et al. | 415/116 |
| 2,977,090 | A | * | 3/1961 | McCarty et al. | 416/96 R |
| 3,220,697 | A | * | 11/1965 | Smuland et al. | 416/96 R |
| 3,486,833 | A | * | 12/1969 | Singleton et al. | 416/241 R |
| 3,807,892 | A | * | 4/1974 | Frei et al. | 415/116 |
| 4,245,951 | A | * | 1/1981 | Minnich | 415/139 |
| 5,468,125 | A | * | 11/1995 | Okpara et al. | 416/97 R |
| 5,971,708 | A | * | 10/1999 | Lee | 416/97 R |
| 6,230,483 | B1 | * | 5/2001 | Sakon et al. | 60/806 |
| 7,021,899 | B2 | * | 4/2006 | Ferte et al. | 416/232 |
| 7,189,064 | B2 | * | 3/2007 | Helder et al. | 416/232 |
| 7,377,098 | B2 | | 5/2008 | Walker et al. | |
| 2005/0129508 | A1 | * | 6/2005 | Fried et al. | 415/115 |

* cited by examiner

*Primary Examiner* — Christopher Verdier
(74) *Attorney, Agent, or Firm* — W. Scott Andes; Trego, Hines & Ladenheim, PLLC

(57) ABSTRACT

A heat exchanger apparatus includes: (a) an airfoil having opposed pressure and suction sides, a root, a tip, and spaced-apart leading and trailing edges; and (b) a plenum integrally formed within the airfoil which is configured to receive a flow of circulating working fluid; and (c) inlet and outlet ports communicating with the plenum and an exterior of the airfoil.

4 Claims, 8 Drawing Sheets

GAS TURBINE ENGINE AIRFOIL INTEGRATED HEAT EXCHANGER

BACKGROUND OF THE INVENTION

This invention relates generally to gas turbine engines and methods for oil cooling in such engines.

Gas turbine engines are commonly provided with a circulating oil system for lubricating and cooling various engine components such as bearings, gearboxes, electrical generators, and the like. In operation the oil absorbs a substantial amount of heat that must be rejected to the external environment in order to maintain the oil at acceptable temperatures. Electric generator oil cooling typically uses one or more air-to-oil heat exchangers (referred to as "air cooled oil coolers" or "ACOCs"), sometimes in series with fuel-to-oil heat exchangers and fuel return-to-tank systems ("FRTT") in a complex cooling network.

Aircraft gas turbine engines have been evolving to "hotter" generator and lubrication systems with more rigorous duty cycles. Physically packaging large ACOCs is more challenging because of smaller engines, increased need for acoustic treatment, and more controls and accessories hardware. Furthermore, transient operational modes can create "pinch points" because of lack of sufficient cooling air flow. For the new generation of electrical starter-generators creates a unique challenge to cooling oil during transient start-modes, when there is insufficient air to cool the system.

BRIEF SUMMARY OF THE INVENTION

These and other shortcomings of the prior art are addressed by the present invention, which provides a gas turbine engine airfoil structure which includes an integral heat exchanger apparatus.

According to one aspect of the invention, a heat exchanger apparatus includes: (a) an airfoil having opposed pressure and suction sides, a root, a tip, and spaced-apart leading and trailing edges; and (b) a plenum integrally formed within the airfoil which is configured to receive a flow of circulating working fluid; and (c) inlet and outlet ports communicating with the plenum and an exterior of the airfoil.

According to another aspect of the invention, a guide vane apparatus for a gas turbine engine includes: (a) a stationary airfoil having opposed pressure and suction sides, a root, a tip, and spaced-apart leading and trailing edges, wherein the tip is coupled to a stationary annular casing; and (b) a plenum integrally formed within the airfoil which is configured to receive a flow of circulating working fluid; and (c) inlet and outlet ports communicating with the plenum and an exterior of the airfoil.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
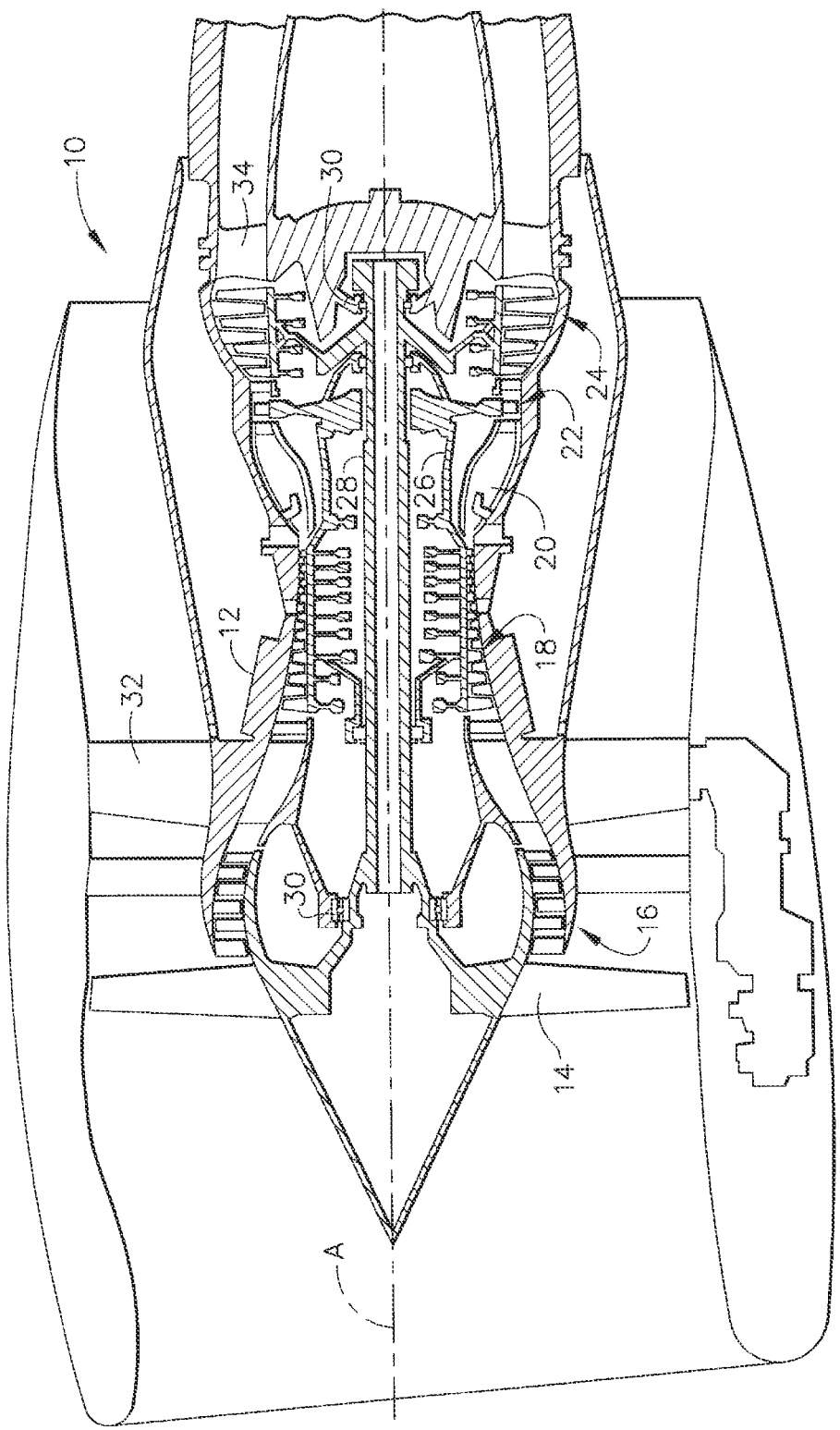
FIG. 1 is a schematic cross-sectional view of a gas turbine engine incorporating a heat exchanger system constructed according to an aspect of the present invention.
Figure 2:
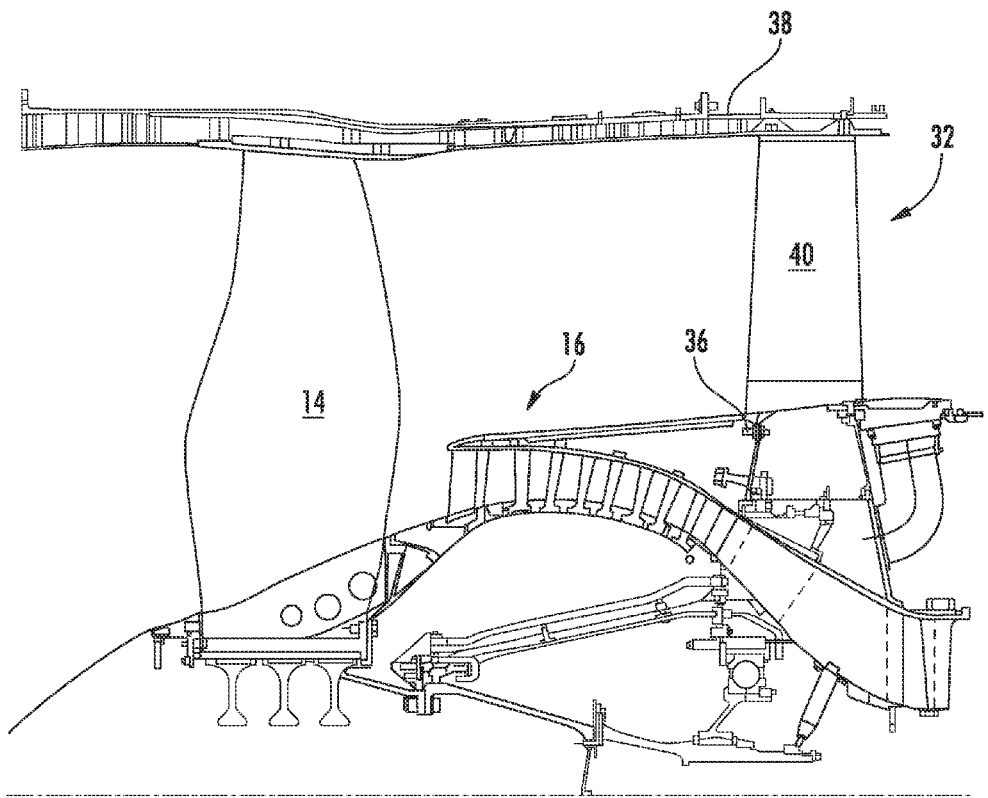
FIG. 2 is an enlarged view of a portion of the gas turbine engine of FIG. 1.

Referring to the drawings wherein identical reference numerals denote the same elements throughout the various views, FIGS. 1 and 2 depict a gas turbine engine 10 incorporating an OGV heat exchanger apparatus constructed according to an aspect of the present invention. While the illustrated example is a high-bypass turbofan engine, the principles of the present invention are also applicable to other types of engines, such as low-bypass, turbojet, etc. The engine 10 has a longitudinal center line or axis A and an outer stationary annular casing 12 disposed concentrically about and coaxially along the axis A. The engine 10 has a fan 14, booster 16, compressor 18, combustor 20, high pressure turbine 22, and low pressure turbine 24 arranged in serial flow relationship. In operation, pressurized air from the compressor 18 is mixed with fuel in the combustor 20 and ignited, thereby generating combustion gases. Some work is extracted from these gases by the high pressure turbine 22 which drives the compressor 18 via an outer shaft 26. The combustion gases then flow into a low pressure turbine 24, which drives the fan 14 and booster 16 via an inner shaft 28. The inner and outer shafts 28 and 26 are rotatably mounted in bearings 30 which are themselves mounted in a fan frame 32 and a turbine rear frame 34.

The fan frame 32 has a central hub 36 connected to an annular fan casing 38 by an annular array of radially extending fan outlet guide vanes ("OGVs") 40 which extend across the fan flowpath. In this example, each of the OGVs 40 is both an aero-turning element and a structural support for the fan casing 38. In other configurations, separate members are provided for the aerodynamic and structural functions. While the concepts of the present invention will be described using the OGVs 40 as an example, it will be understood that those concepts are applicable to any stationary airfoil-type structure within the engine 10.

Figure 3:
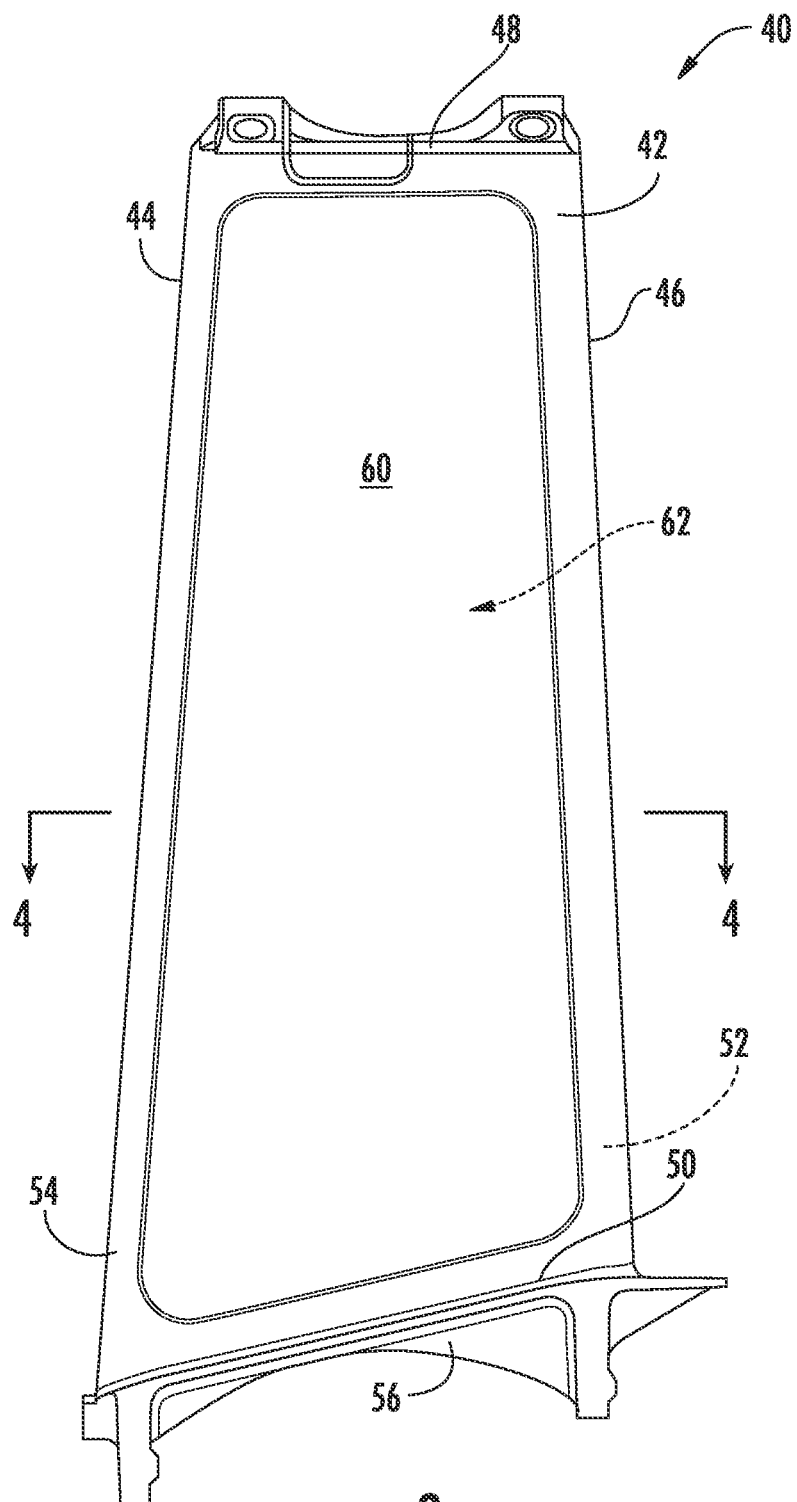
FIG. 3 is a side view of an outlet guide vane constructed in accordance with an aspect of the present invention.
Figure 4:
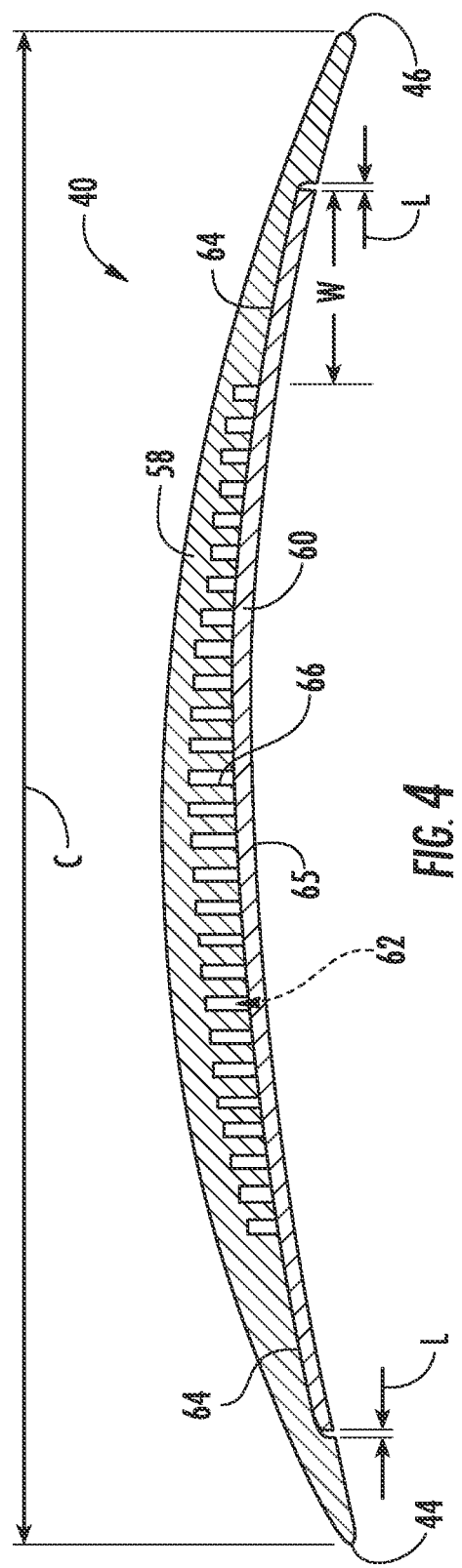
FIG. 4 is a cross-sectional view taken along lines 4-4 of FIG. 3.
Figure 5:
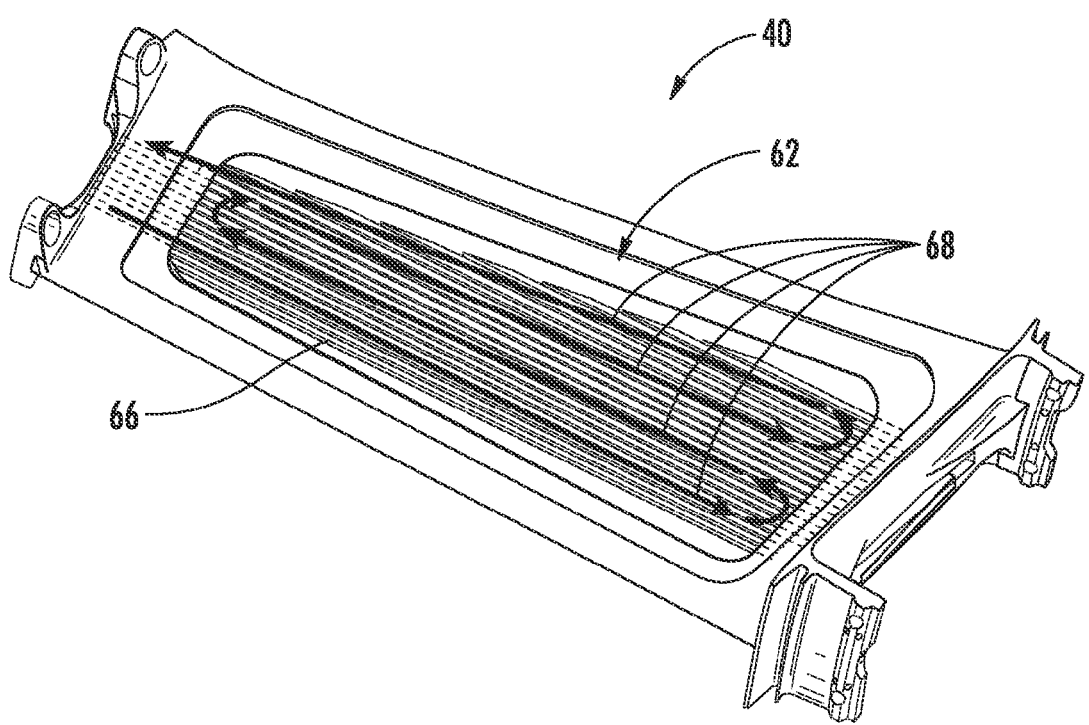
FIG. 5 is a perspective view of the outlet guide vane of FIG. 3, with a cover removed to show the internal construction thereof.

Some or all of the fan OGVs 40 in the engine 10 include heat exchangers integrated into their structure. FIGS. 3-5 illustrate one of the fan OGVs 40 in more detail. The OGV comprises an airfoil 42 having a leading edge 44, a trailing edge 46, a tip 48, a root 50, a convex suction side 52, and a concave pressure side 54. An arcuate inner platform 56 is disposed at the root 50 of the airfoil 42.

The airfoil 42 is assembled from a body 58 and a cover 60. The body 58 and the cover 60 are both made from a material with suitable strength and weight characteristics for the intended application. One example of a suitable alloy is a 7000 series aluminum alloy, in particular a 7075 aluminum alloy. The body 58 is a unitary component which may be produced by forging, for example. It incorporates a plenum 62 (see FIG. 4) configured as a pocket formed in its pressure side 54. Alternatively or in addition, the plenum 62 could also comprise a pocket formed in the suction side 52. There is a continuous ledge 64 disposed around the periphery of the plenum 62 that receives the periphery of the cover 60. The cover 60 may be secured to the ledge 64 by any means which provides a secure, leak-free joint, such as adhesive bonding, fusion welding, or a solid-state bond such as that produced by friction stir welding. The cover 60 may further be secured to structures of the airfoil 42 within the perimeter of the plenum 62 (e.g. walls, ribs, etc., described in more detail below) in order to prevent fluid leakage between various channels and flow paths defined within the airfoil 42. This ledge 64 has an average width "W" which is selected to be as narrow as possible to save weight and material, while still leaving enough material for a full penetration weld through the cover 60. In the illustrated example, the width W is less than about 1.27 cm (0.5 in.) and is preferably about 0.89 cm (0.35 in.)

The cover 60 is a unitary component including inner and outer surfaces which fits down into the plenum 62 so that the outer surface 65 is substantially flush with the pressure side 22 of the airfoil 42. The outer surface 65 of the cover 60 forms a portion of the pressure side 22 of the airfoil 42. In plan view, the cover 60 is generally rectangular with radiused corners. It serves only as an aerodynamic element and may have a relatively small thickness, for example approximately 2 mm (0.08 in.). To provide an acceptable weld joint, the periphery of the cover 60 is fitted to the periphery of the plenum 62 with a small lateral tolerance "L", for example about 0.127 mm (0.005 in.)

The plenum 62 provides a space within the OGV 40 for a flow of working fluid, for example lubrication oil. The plenum 62 is integral to the OGV 40, or in other words, the plenum 62 is defined by the structure of the OGV 40 itself, rather than any intermediate structure, such as filler materials used in the prior art. In operation, this results in working fluid being in intimate contact with the inner surface of the skin of the OGV 40 so as to maximize heat transfer rate. The interior of the plenum 62, i.e. its size, shape, surface texture, and arrangement of internal walls or other features, may be configured to maximize heat transfer between the working fluid and the OGV 40, minimize pressure loses, and so forth. As used herein the term "plenum" refers to the entire volume available for flow of working fluid within the OGV 40, regardless of whether it is configured as a unitary space or several smaller spaces.

For example, as shown in FIGS. 4 and 5 the interior of the plenum 62 is configured as a plurality of parallel channels 66 running in a generally radial (i.e. spanwise) direction and separated by walls or ribs. Groups of the channels 66 (for example five) may be arranged into serpentine "passes" which are shown schematically by the arrows labeled 68. A four-passage arrangement is shown. The passes may be defined by channels integrally formed within the OGV 40 or by a tube or header structure external to the OGV 40. The channels 66 may be formed, for example, by a machining process before the cover 60 is installed as described above. In the illustrated example, the width of each of the channels 66 is approximately 6.4 mm (0.25 in.). For ease of design, the number of channels 66 and their cross-sectional design may be selected so that the flow area of each pass 68 is substantially equal to a commonly available tubing size.

Figure 6:
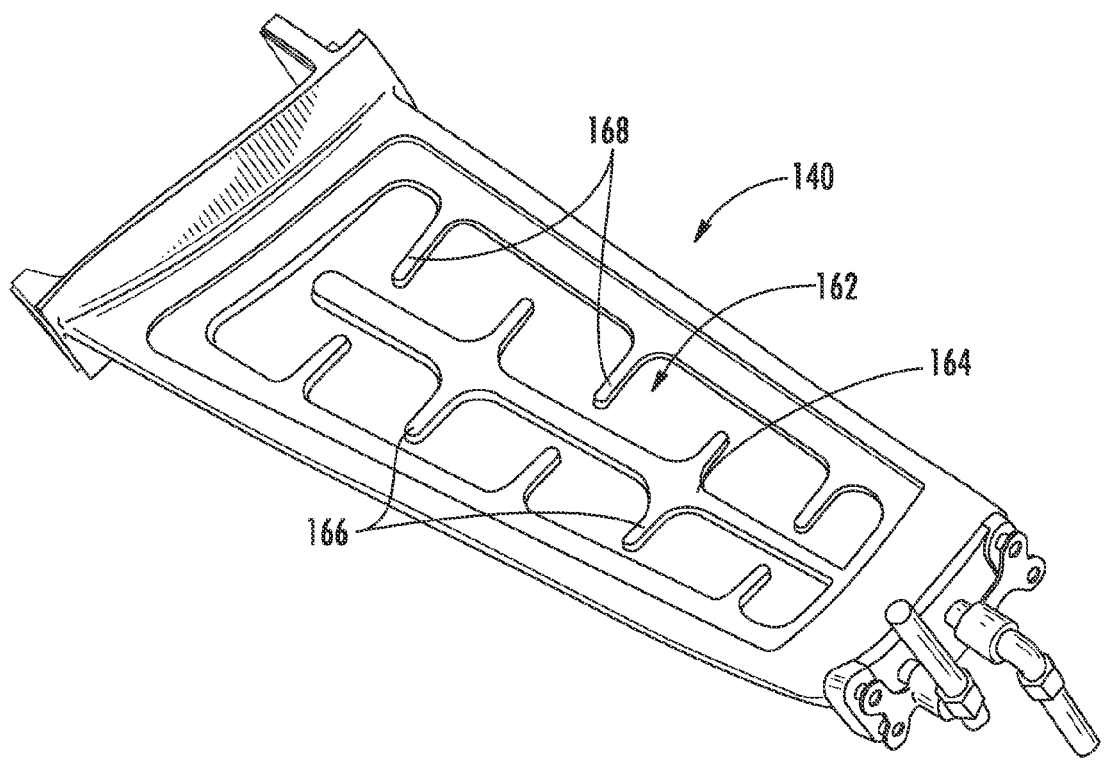
FIG. 6 is a perspective view of an alternative outlet guide vane, with a cover removed to show the internal construction thereof.

FIG. 6 illustrates an OGV 140 incorporating an alternative plenum 162. The plenum 162 includes a central septum 164 which runs in a generally spanwise direction in approximately a mid-chord location within the plenum 162. A plurality of inner walls 166 extend forward and aft from the septum 164 at intervals along its length. A plurality of outer walls 168 extend inboard from the periphery of the plenum 162 at alternate spanwise locations relative to the inner walls 166. Together, the septum 164 and inner and outer walls 166 and 168 define a serpentine flowpath which follows a generally "U"-shaped path through the plenum 162.

Figure 7:
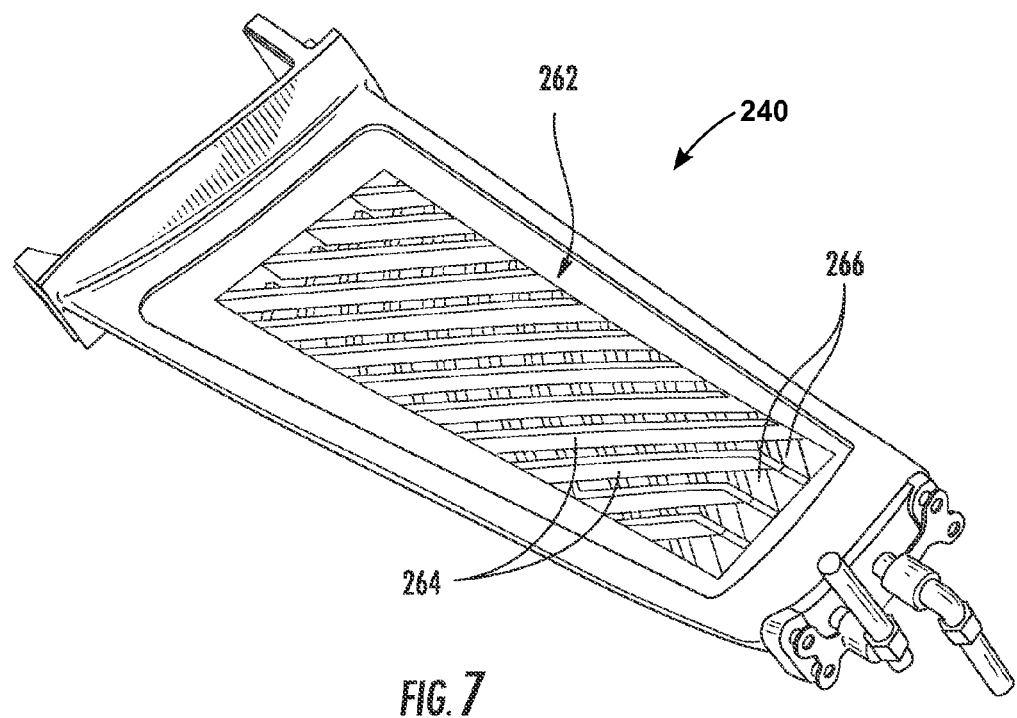
FIG. 7 is a perspective view of an alternative outlet guide vane, with a cover removed to show the internal construction thereof.

FIG. 7 illustrates yet another alternative OGV 240 incorporating an alternative plenum 262. An array of first walls 264 lie in a first plane and extend across the plenum at a first acute angle. An array of second walls 266 lie underneath the first walls 264 in a second plane and extend across the plenum 262 perpendicular to the first walls 264. Working fluid is introduced to the first plane and flows parallel to the first walls 264 until it reaches their ends, where it flows across to the second plane and parallel to the second walls 266, thus generating a cross-flow action.

Figure 8:
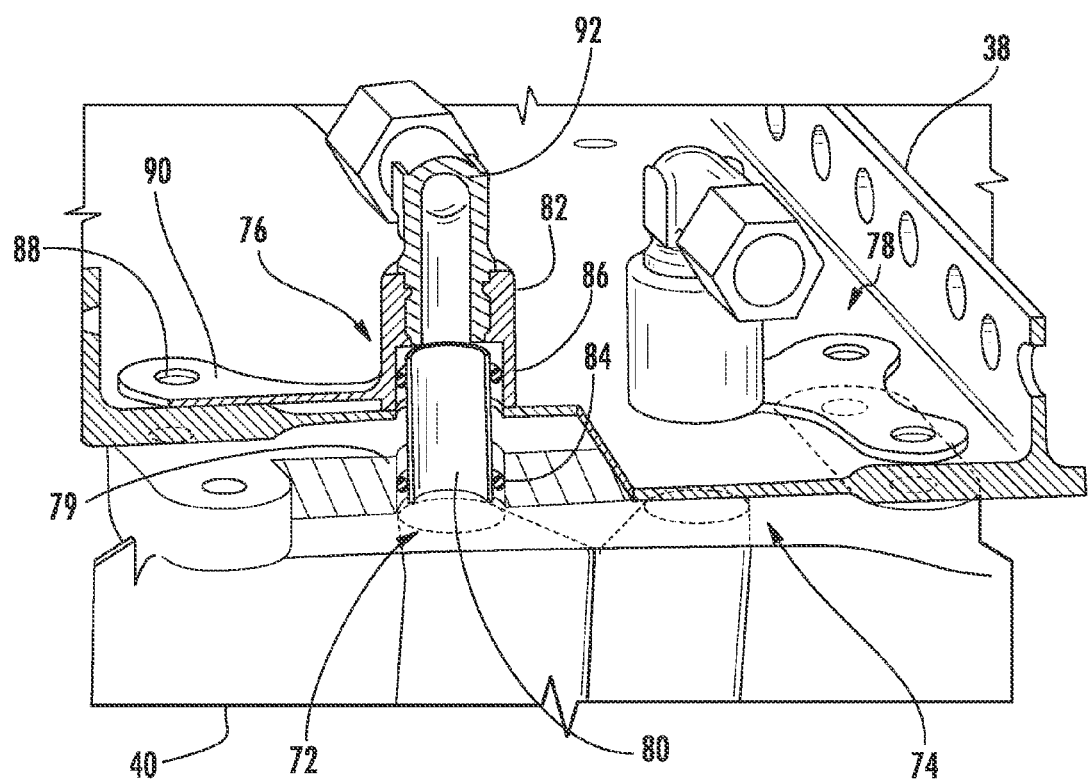
FIG. 8 is a partially-sectioned perspective view of an outlet guide vane and a fluid coupling apparatus.

FIG. 8 illustrates a structure for transferring working fluid to and from the OGV 40. The structure will be explained with reference to the OGV 40 shown in FIGS. 3-5, with the understanding that the same structure is applicable to the alternative configurations described above. The tip 48 of the OGV 40 has inlet and outlet ports 72 and 74 formed therein, communicating with the plenum 62. An inlet jumper tube assembly 76 is coupled to the inlet port 72, and an outlet jumper tube assembly 78 is coupled to the outlet port 74. The ports 72 and 74 are substantially identical in construction, accordingly only the inlet port 72 and its associated inlet jumper tube assembly 76 will be described in detail. The inlet port 72 has an opening 79 located at the outer face of the OGV 40. The inner end of a generally cylindrical jumper tube 80 is received in the inlet port 72. The jumper tube 80 spans the radial gap between the tip 48 of the OGV 40 and the fan casing 38 and passes through an opening in the fan casing 38. The outer end of the jumper tube 80 is received in a hollow retainer 82. Seals 84 and 86, such as the illustrated "O"-rings, prevent leakage between the jumper tube-to-OGV and jumper tube-to-retainer interfaces, while permitting some relative motion between the OGV 40 and the fan casing 38. The retainer 82 is secured to the outer surface of the fan casing 38. In the illustrated example, the retainer 82 is clamped to the fan casing 38 using fasteners of a conventional type such as bolts (not shown) passing through holes 88 in the fan casing 38 and a mounting flange 90 of the retainer 82. The outer end of the retainer 82 has a fluid fitting 92 installed therein, which in the illustrated example is an elbow. The fluid fitting 92 is connected in turn to a supply tube (not shown).

In operation, hot working fluid from the engine (e.g. lubricating oil or accessory cooling oil) is ported to the inlet jumper tube assembly 76. The working fluid flows through the plenum 62 where heat is removed from the fluid by transfer to the airflow surrounding the OGV (in this case fan bypass flow). The heated oil then passes out through the outlet jumper tube assembly 78 and back to the remainder of the oil system. The oil circulation flow through the OGVs 40 may be parallel or serial as dictated by the particular application. It will be understood that the oil system incorporates pumps, filters, lines, valves, tanks, and other equipment as needed to provide a flow of pressurized oil. Such components are well-known and therefore not illustrated here.

Using the concepts described herein, turbine engine OGVs will incorporate an oil cooling function, in addition to aero-turning and structural functions. The oil cooling function is performed at the periphery of the vane to take advantage of the heat exchange along the pressure and suction sides of the airfoil and as such is This concept has several advantages. Among them are substantially lower oil pressure drop than prior art ACOCs, as well as lower noise levels, and a substantial weight savings from eliminating ACOCs and the associated engine "FRTT". A significant improvement in specific fuel consumption ("SFC") is expected as well.

The foregoing has described an airfoil structure with integrated heat exchanger for a gas turbine engine and a method for its operation. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only.

What is claimed is:

1. A guide vane apparatus for a gas turbine engine comprising:
   (a) an annular array of stationary airfoils, each stationary airfoil comprising:
      (i) opposed pressure and suction sides, a root, a tip, and spaced-apart leading and trailing edges;
      (ii) a plenum integrally formed within the airfoil which is configured to receive a flow of circulating working fluid;
      (iii) inlet and outlet ports disposed at the tip of the airfoil, each port communicating with the plenum and an exterior of the airfoil;
   (b) an annular casing surrounding the array of stationary airfoils, wherein the tip of each stationary airfoil is connected to the casing; and
   (c) a jumper tube assembly coupled to each of the inlet and outlet ports, each jumper tube assembly comprising:
      (i) a jumper tube having a first end received within the respective port, the jumper tube spanning a radial gap between the tip of the airfoil and the casing and passing through an opening in the casing; and
      (ii) a retainer attached to the casing which receives a second end of the jumper tube and retains the jumper tube in position, the retainer including a fluid fitting in fluid communication with the jumper tube, wherein the retainer includes an internal surface that blocks the jumper tube from radially outward movement relative to the casing.

2. The apparatus of claim 1, wherein the plenum comprises:
   an array of first walls lying in a first plane and extending across the plenum at a first acute angle; and
   an array of second walls lying underneath the first walls in a second plane and extending across the plenum perpendicular to the first walls.

3. The apparatus of claim 1 wherein the airfoil comprises:
   a metallic body defining the pressure and suction sides, root, tip, and leading and trailing edges, the body having a recessed pocket formed in a selected one of the pressure and suction sides; and
   a metallic cover having an outer peripheral edge, an inner surface, and an outer surface, the outer surface defining a portion of the selected one of the pressure or suction sides, wherein the cover is attached to the body, wherein the pocket and the cover cooperatively define the plenum.

4. The apparatus of claim 3 wherein the cover is attached to the body by a solid state bond.

* * * * *